United States Patent
Feroz et al.

(10) Patent No.: US 12,377,852 B2
(45) Date of Patent: Aug. 5, 2025

(54) METHODS AND SYSTEM FOR OPERATING A VEHICLE IN SAND

(71) Applicant: Ford Global Technologies, LLC, Dearborn, MI (US)

(72) Inventors: Zubair Feroz, Dearborn, MI (US); Bang Cao, Northville, MI (US); Joseph Jay Torres, Dearborn, MI (US); Peter James Barrette, Jupiter, FL (US); Jonathan Sullivan, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 18/163,086

(22) Filed: Feb. 1, 2023

(65) Prior Publication Data

US 2024/0253637 A1   Aug. 1, 2024

(51) Int. Cl.
*B60W 30/18* (2012.01)
*B60L 15/20* (2006.01)

(52) U.S. Cl.
CPC ... *B60W 30/18172* (2013.01); *B60L 15/2063* (2013.01); *B60L 2240/12* (2013.01); *B60L 2240/24* (2013.01); *B60L 2250/26* (2013.01); *B60W 2540/12* (2013.01); *B60W 2552/40* (2020.02); *B60W 2710/207* (2013.01); *B60W 2720/28* (2013.01)

(58) Field of Classification Search
CPC ....... B60W 30/18172; B60W 2540/12; B60W 2552/40; B60W 2710/207; B60W 2720/28; B60L 15/2063; B60L 2240/12; B60L 2240/24; B60L 2250/26

See application file for complete search history.

(56) References Cited

U.S. PATENT DOCUMENTS

| | | |
|---|---|---|
| 8,061,464 B2 | 11/2011 | Boesch |
| 8,244,445 B2 | 8/2012 | Luehrsen et al. |
| 8,352,145 B2 | 1/2013 | Jematsu et al. |
| 9,744,862 B2 | 8/2017 | Arbitmann et al. |
| 9,827,982 B2 | 11/2017 | Owen et al. |
| 10,486,664 B2 | 11/2019 | Berels |
| 10,589,778 B2 | 3/2020 | Siddiqui et al. |
| 10,696,288 B2 | 6/2020 | Gaither et al. |
| 10,759,433 B2 | 9/2020 | Falconer et al. |
| 10,981,571 B2 | 4/2021 | Ortmann et al. |
| 2015/0051777 A1 | 2/2015 | Jalbout et al. |
| 2015/0232092 A1* | 8/2015 | Fairgrieve ....... B60W 30/18172 701/93 |
| 2015/0291170 A1 | 10/2015 | Mair et al. |
| 2016/0244057 A1* | 8/2016 | Kelly ................. B60W 30/143 |
| 2018/0370562 A1* | 12/2018 | Haller .................. B62D 5/0463 |
| 2020/0010065 A1* | 1/2020 | Books .................. B60W 10/18 |
| 2021/0055728 A1 | 2/2021 | Pomish |
| 2021/0197778 A1* | 7/2021 | Shi ........................ B60T 8/1761 |
| 2021/0214001 A1* | 7/2021 | Solomon ................ B62D 7/159 |

(Continued)

*Primary Examiner* — Jelani A Smith
*Assistant Examiner* — Alyssa Rorie
(74) *Attorney, Agent, or Firm* — David Kelley; McCoy Russell LLP (57) ABSTRACT

Methods and systems are provided for operating a vehicle in a mode to free the vehicle from being stuck in sand are presented. In one example, a speed of an electric machine is adjusted to determine when wheel jitter occurs. The electric machine speed may be maintained at a speed where wheel jitter occurs while the vehicle is stuck.

20 Claims, 6 Drawing Sheets

(56) References Cited

U.S. PATENT DOCUMENTS

2021/0253101 A1\* 8/2021 Nahrwold ............ B60W 30/182
2023/0322294 A1\* 10/2023 Takano ................... G01L 5/221
701/41

\* cited by examiner

METHODS AND SYSTEM FOR OPERATING A VEHICLE IN SAND

FIELD

The present description relates generally to methods and systems for operating a vehicle in sand. The methods and systems may be particularly useful for vehicles that are stuck in sand.

BACKGROUND/SUMMARY

A vehicle may travel off road and operate in sand. The surface of the sand may deform and it may allow the vehicle's wheels to dig holes that may be difficult for the vehicle to exit. If the vehicle's driver simply applies the vehicle's driver demand pedal, the vehicle's wheels may dig themselves to a point where the vehicle's chassis sinks toward the sand and makes it even more difficult for the vehicle to travel in a desired direction. Some vehicle operators may have experience driving in sand and these vehicle operators may have a reduced chance of getting their vehicle stuck. However, less experienced operators may have an increased possibility of getting their vehicle stuck. Further, once the vehicle of the less experienced operator is stuck, the operator may not have the skills to get the vehicle unstuck without getting a tow. Therefore, it may be desirable to provide a vehicle driving mode that helps a driver to free a vehicle from sand without a tow.

The inventors herein have recognized the above-mentioned issues and have developed a vehicle operating method, comprising: in response to operating a vehicle in a mode to free the vehicle from a medium, commanding a motor via a controller to rotate a wheel at a constant speed at which an actual speed of the wheel increases and decreases.

By commanding a motor via a controller to rotate a wheel at a constant speed at which an actual speed of the wheel increases and decreases, it may be possible to provide the technical result of releasing a stuck vehicle from sand or another medium. In particular, the commanded wheel speed is where the actual wheel speed changes even though the commanded wheel speed is constant, may be an optimal speed for freeing the vehicle. The optimal speed may be a speed where a tire of the wheel crosses or moves between static friction and dynamic friction. This speed may allow the tire to shake sand off the tire so that sand builds up under the tire, thereby allowing the vehicle to free itself without a tow.

The present description may provide several advantages. In particular, the approach may allow a vehicle to free itself from a stuck position. Further, the approach may be applied to each vehicle wheel so that the individual wheels may free themselves. In addition, the approach may be applied to different vehicle configurations.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
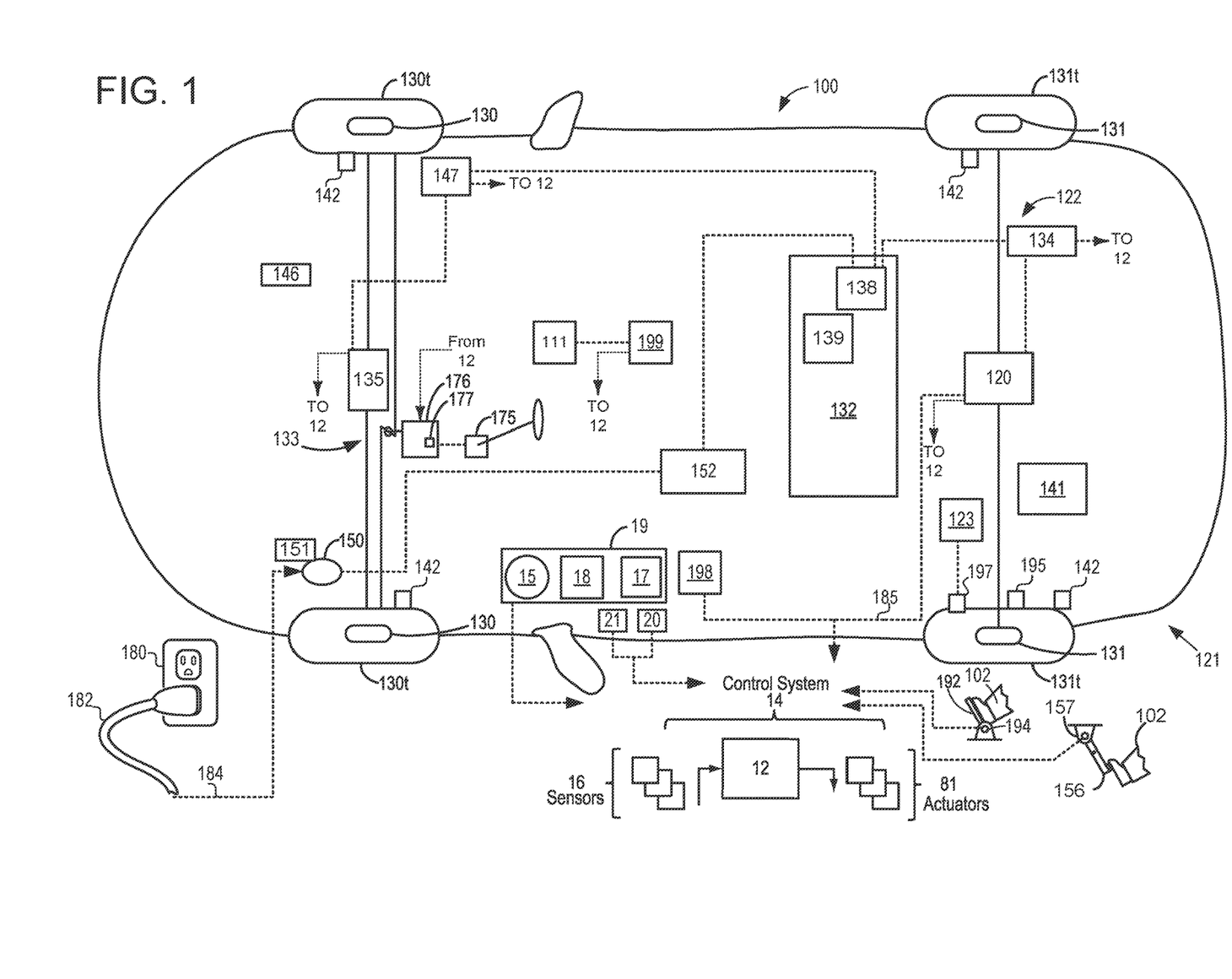
FIGS. 1-3 are schematic diagrams of example vehicle drivelines.
Figure 2:
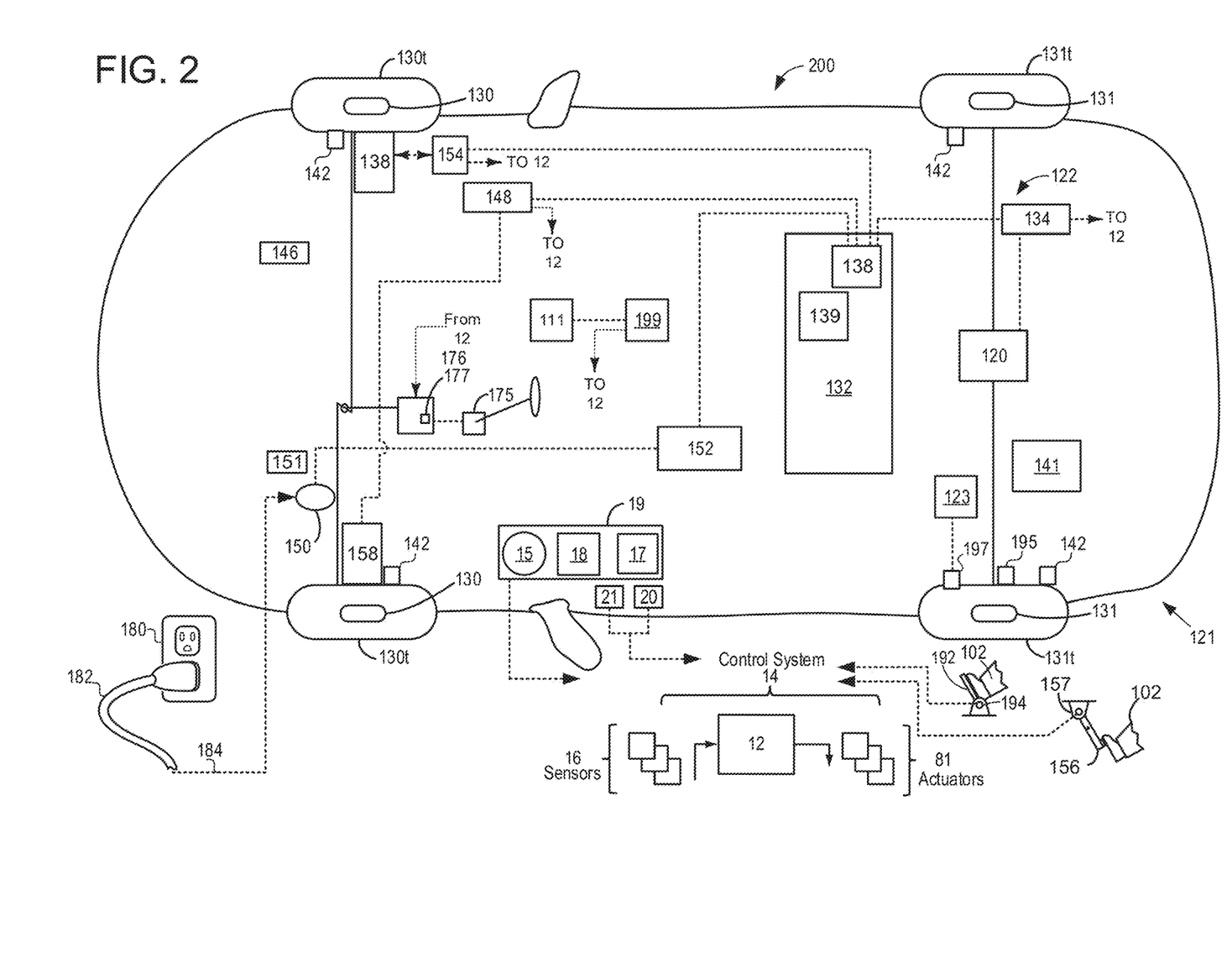
Figure 3:
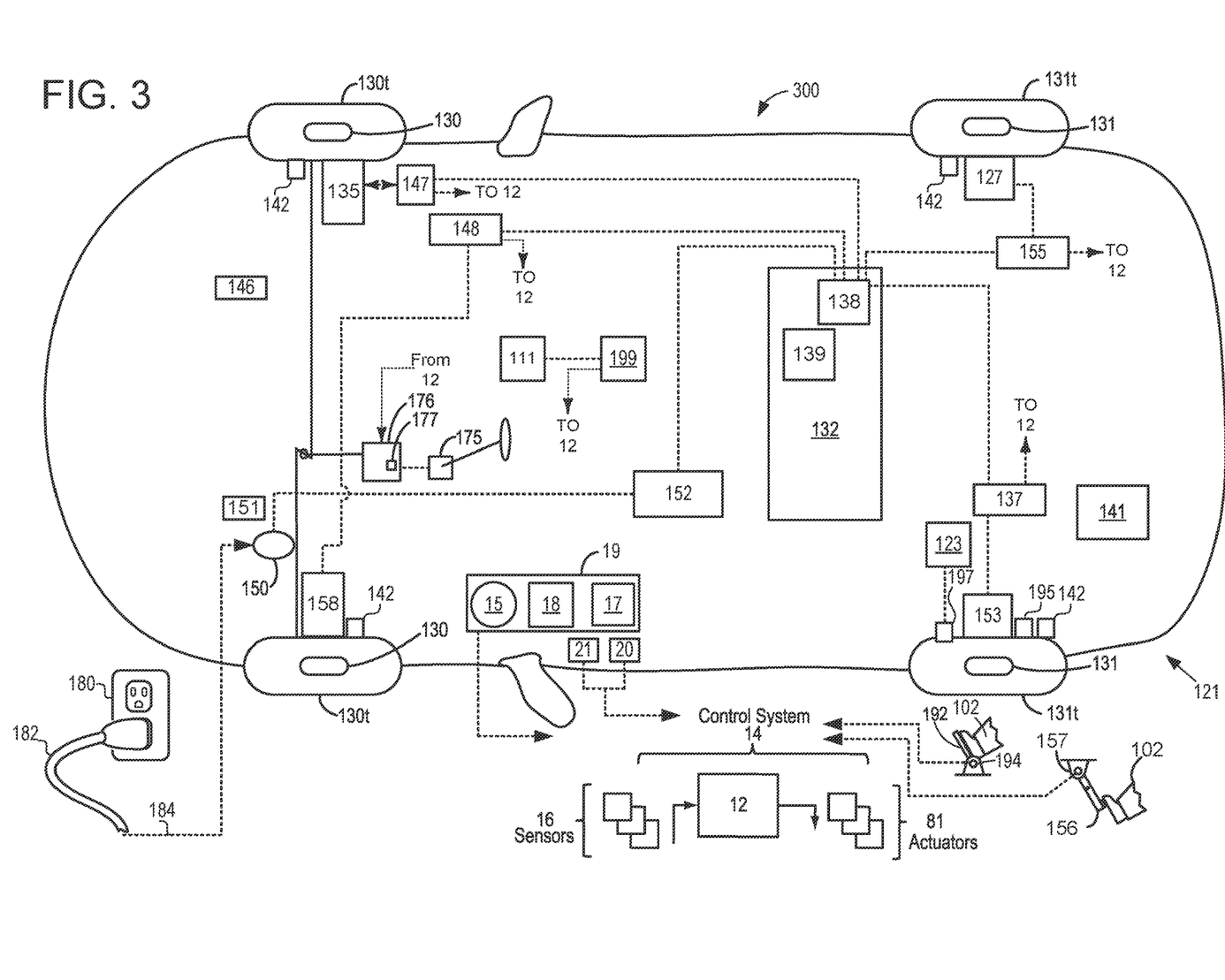
Figure 4:
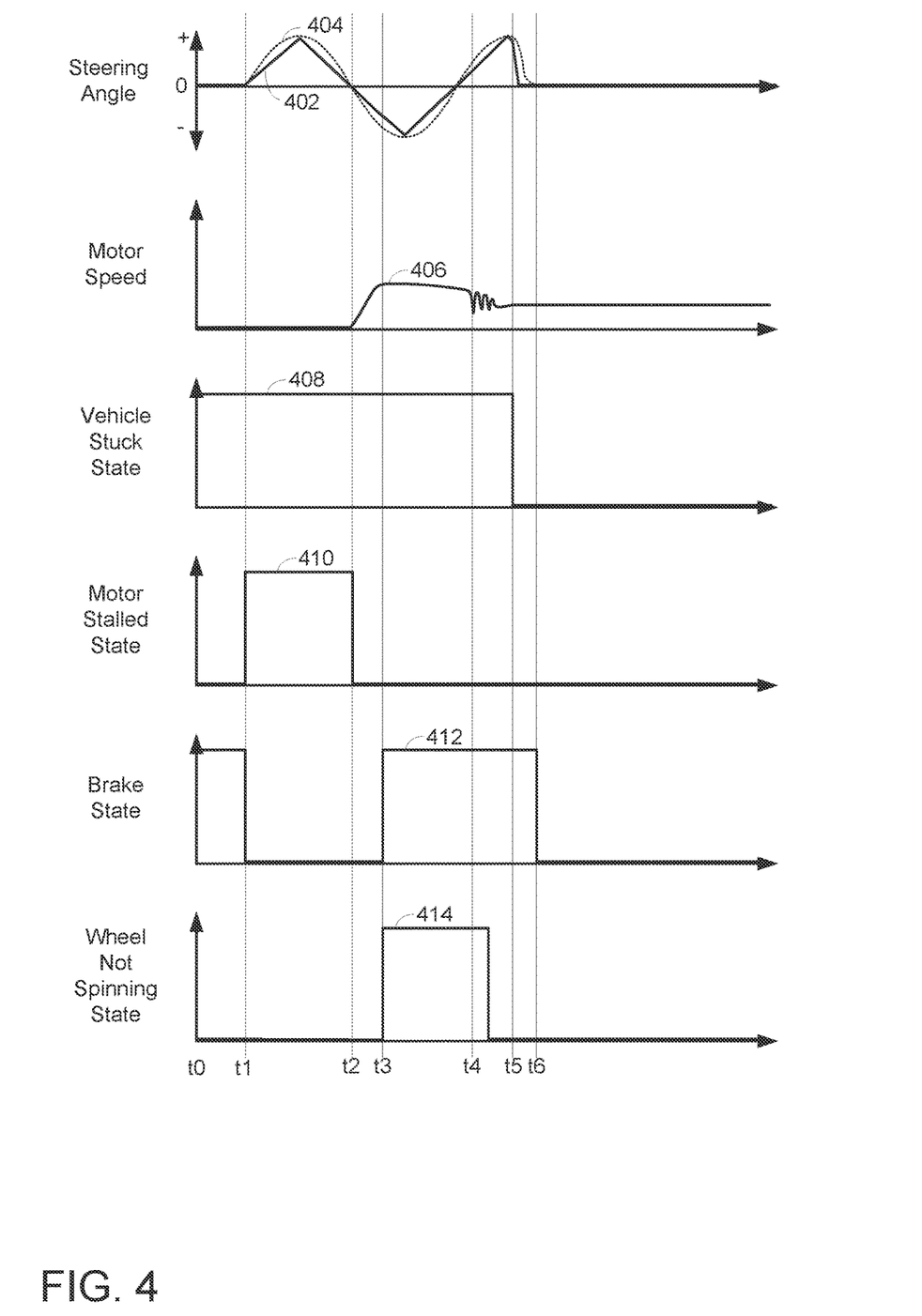
FIG. 4 shows plots of an example vehicle operating sequence according to the method of FIG. 5.
Figure 5:
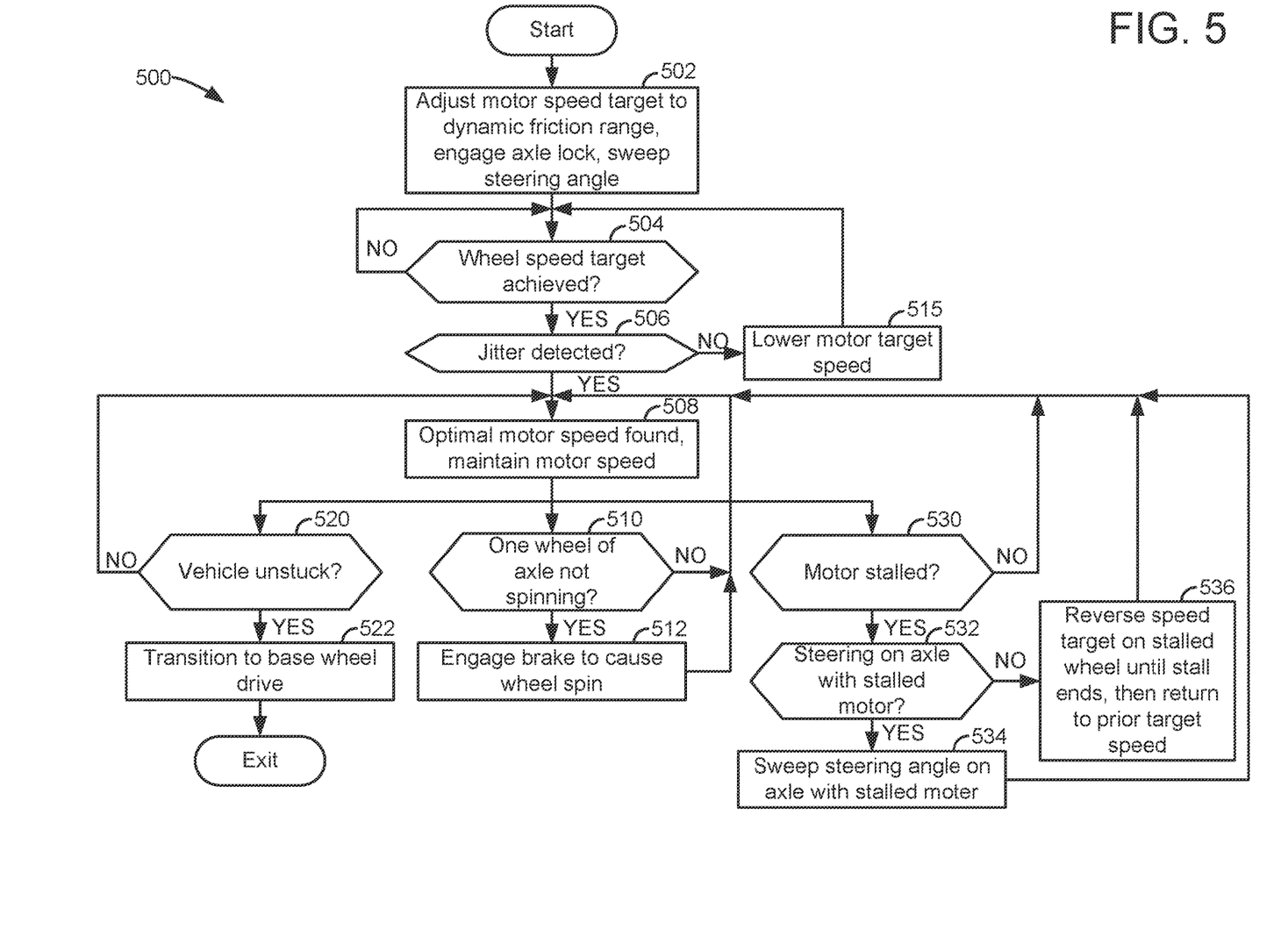
FIG. 5 is a flowchart of a method for operating a vehicle in sand or other deformable medium.
Figure 6A:
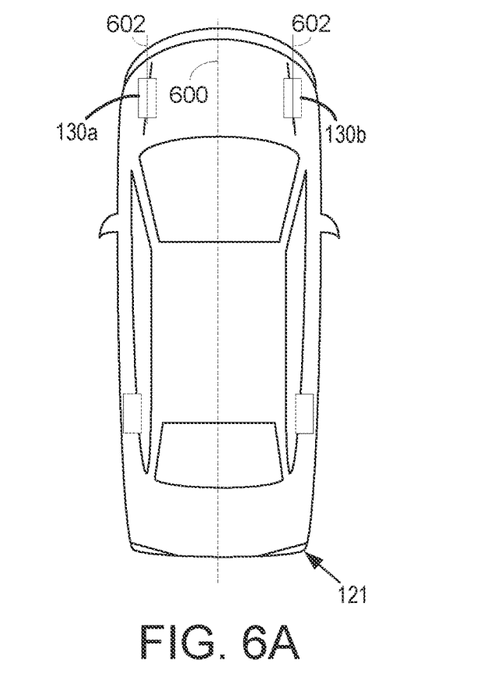
FIGS. 6A and 6B are schematic diagrams showing a vehicle steering angle.
Figure 6B:
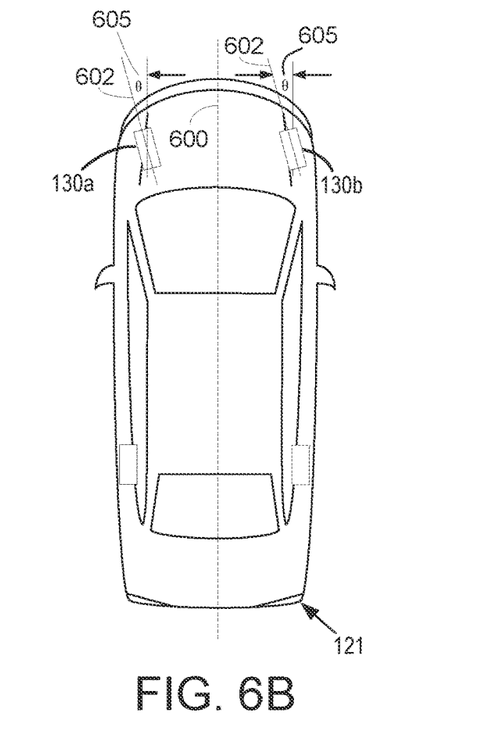

The following description relates to systems and methods for operating a vehicle. FIGS. 1-3 show example vehicle configurations for applying the method of FIG. 5. An example operating sequence for a vehicle wheel is shown in FIG. 4. The operating sequence shows how a vehicle's wheels may be controlled to build up sand or other medium underneath tires in order to free a stuck vehicle. A method for operating a stuck vehicle is shown in FIG. 5. The method of FIG. 5 may be applied to each of the vehicle's driven wheels. FIGS. 6A and 6B show a vehicle steering angle. The vehicle steering angle may be adjusted to increase build-up of sand under a wheel so that traction of the wheel may be adjusted.

FIG. 1 illustrates an example vehicle propulsion system 100 for vehicle 121. In this example, vehicle propulsion system 100 includes two electric machines that may be applied to propel vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120 and a second electric machine (e.g., a propulsive force electric machine) 135 for propelling vehicle 121. However, in other examples, vehicle 121 may include only one electrical machine for providing propulsive force. Electric machine 120 and electric machine 135 are controlled via controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12. In some examples, the vehicle propulsion system 100 may include an internal combustion engine (not shown).

Vehicle propulsion system 100 has a front axle 133 and a rear axle 122. Vehicle propulsion system 100 further includes front wheels 130 and rear wheels 131. In this example, front wheels 130 and/or rear wheels 131 may be driven via electrical propulsion sources. The rear axle 122 is coupled to electric machine 120. Electric machine 120 is shown incorporated into rear axle 122 and electric machine 135 is shown incorporated into front axle 133.

Electric machines 120 and 135 may receive electrical power from onboard electrical energy storage device 132. Furthermore, electric machines 120 and 135 may provide a generator function to convert the vehicle's kinetic energy into electrical energy, where the electrical energy may be stored at electric energy storage device 132 for later use by the electric machine 120 and/or 135. A first inverter system controller (ISC1) 134 may convert alternating current generated by electric machine 120 to direct current for storage at the electric energy storage device 132 and vice versa. A second inverter system controller (ISC2) 147 may convert alternating current generated by electric machine 135 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, energy storage device 132, electric machine 135, etc. Control system 14 may receive sensory feedback information from one or more of electric machine 135, electric machine 120, energy storage device 132, etc. Further, control system 14 may send control signals to one or more of electric machine 135, electric machine 120, energy storage device 132, etc., responsive to this sensory feedback. Control system 14 may receive an indication of an operator requested output of the vehicle propulsion system from a human operator 102, or an autonomous controller. For example, control system 14 may receive sensory feedback from driver demand pedal position sensor 194 which communicates with driver demand pedal 192. Similarly, control system 14 may receive an indication of an operator requested vehicle braking via a human operator 102, or an autonomous controller. For example, control system 14 may receive sensory feedback from brake pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical energy transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical energy transmission cable 182 may be disconnected between power source 180 and energy storage device 132. Control system 14 may identify and/or control the amount of electrical energy stored at the energy storage device, which may be referred to as the state of charge (SOC).

In other examples, electrical energy transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it may be appreciated that any suitable approach may be used for recharging energy storage device 132 from a power source that does not comprise part of the vehicle. In this way, electric machine 120 and electric machine 135 may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include an ambient temperature/humidity sensor 198. Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. The control system may adjust electric machine output and/or the torque vectoring electric machines to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle Data from inertial sensor 199 may also be communicated to controller 12, or alternatively, sensors 199 may be electrically coupled to controller 12.

One or more tire pressure monitoring sensors (TPMS) may be coupled to one or more tires (e.g., 130*t* and 131*t*) of wheels (e.g., 130 and 131) in the vehicle. For example, FIG. 1 shows a tire pressure sensor 197 coupled to wheel 131 and configured to monitor a pressure in a tire 131*t* of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Additionally, vehicle propulsion system 100 may further include an inclinometer 21. Vehicle propulsion system 100 may also include a steering control system 176 that may adjust a steering angle via adjusting a position of steering motor 177.

Vehicle propulsion system 100 may further include a brake system control module (BSCM) 141 to apply and release friction wheel brakes 142. In some examples, BSCM 141 may comprise an anti-lock braking system, such that tires (e.g., 130*t* and 131*t*) of wheels (e.g. 130, 131) may maintain tractive contact with the road surface according to driver inputs while braking, which may thus prevent the wheels from locking up, to prevent skidding. In some examples, BSCM 141 may receive input from wheel speed sensors 195.

Vehicle propulsion system 100 may further include a motor electronics coolant pump (MECP) 146. MECP 146 may be used to circulate coolant to diffuse heat generated by at least electric machine 120 and electric machine 135 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, inertial sensors 199, etc. In some examples, steering angle sensor 175, sensors associated with electric machine 135 and electric machine 120, etc., may communicate information to controller 12, regarding various states of electric machine operation.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator interface 15 may include interfaces that apply a physical apparatus, such as an active key, that may be inserted into the operator interface 15 to activate electric machines 135 and 120, or may be removed to shut down the electric machines 135 and 120 to turn off the vehicle. Other examples may include a passive key that is communicatively coupled to the operator interface 15. The passive key may be configured as an electronic key fob or a smart key that does not have to be inserted or removed from the operator interface 15 to operate the vehicle engine. Rather, the passive key may need to be located inside or proximate to the vehicle (e.g., within a threshold distance of the vehicle).

Still other examples may additionally or optionally use a start/stop button that is manually pressed by the operator to start or shut down the engine and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Turning now to FIG. 2, a second example vehicle propulsion system 200 for vehicle 121 is shown. In this example, vehicle propulsion system 200 includes three electric machines that may be applied to propel vehicle 121. Some elements of FIG. 2 are indicated with the same numerical identifies that are shown in FIG. 1. Elements of FIG. 2 that are indicated with the same numerical indicators shown in FIG. 1 are equivalent to those shown in FIG. 1. For example, electric machine 120 shown in FIG. 2 is the same electric machine 120 that is shown in FIG. 1. Therefore, for the sake of brevity, descriptions of equivalent elements in FIG. 2 will not be repeated. Rather, the description of FIG. 2 focuses on elements that are unique to the vehicle propulsion system shown in FIG. 2.

In this example, vehicle propulsion system 200 includes an electric machine 158 that is coupled to solely to one wheel. Vehicle propulsion system 200 also includes a second electric machine 138 that is coupled solely to one wheel. Vehicle propulsion system 200 drives rear axle 122 via electric machine 120. Thus, vehicle propulsion system 200 may be propelled by between one and three electric machines. In alternative examples, an electric machine may be provided to each rear wheel to drive the rear wheels and a single electric machine may selectively drive the front wheels.

A second inverter system controller 154 may convert alternating current generated by electric machine 138 to direct current for storage at the electric energy storage device 132 and vice versa. A third inverter system controller 148 may convert alternating current generated by electric machine 158 to direct current for storage at the electric energy storage device 132 and vice versa.

Referring now to FIG. 3, a third example vehicle propulsion system 300 for vehicle 121 is shown. In this example, vehicle propulsion system 300 includes four electric machines that may be applied to propel vehicle 121. Some elements of FIG. 3 are indicated with the same numerical identifies that are shown in FIGS. 1 and 2. Elements of FIG. 3 that are indicated with the same numerical indicators shown in FIGS. 1 and 2 are equivalent to those shown in FIGS. 1 and 2. For example, electric energy storage device 132 shown in FIG. 3 is the same electric energy storage device 132 that is shown in FIGS. 1 and 2. Therefore, for the sake of brevity, descriptions of equivalent elements in FIG. 3 will not be repeated. Rather, the description of FIG. 3 focuses on elements that are unique to the vehicle propulsion system shown in FIG. 3.

In this example, vehicle propulsion system 300 includes a first electric machine 127 that is coupled to solely to one wheel. Vehicle propulsion system 300 also includes a fourth electric machine 153 that is coupled solely to a wheel. Thus, each wheel of vehicle propulsion system 200 may be driven individually by an electric machine such that there is individual control of each wheel.

A first inverter system controller 155 may convert alternating current generated by electric machine 127 to direct current for storage at the electric energy storage device 132 and vice versa. A fourth inverter system controller 137 may convert alternating current generated by fourth electric machine 153 to direct current for storage at the electric energy storage device 132 and vice versa.

The systems of FIGS. 1-3 provide for a vehicle system, comprising: an electric machine; a wheel; one or more controllers including executable instructions stored in non-transitory memory that cause the controller to generate a command to rotate the wheel at a speed, generate commands to decrease a rotational speed of the wheel from the speed, and generate a command to maintain the rotational speed in response to an actual speed of the wheel increasing and decreasing. In a first example, the vehicle system includes where the command to rotate the wheel at the speed is generated in a vehicle operating mode for freeing a vehicle from a medium. In a second example that may include the first example, the vehicle system includes where the electric machine rotates the wheel in response to the command to rotate the wheel. In a third example that may include one or both of the first and second examples, the vehicle system of claim 9, further comprising a steering system, and additional instructions to vary a steering angle via the steering system in response to an indication of a vehicle being stuck. In a fourth example that may include one or more of the first through third examples, the vehicle system further comprises a brake pedal, and where the command to rotate the wheel is generated while the brake pedal is released. In a fifth example that may include one or more of the first through fourth examples, the vehicle system further comprises additional instructions to generate a command to rotate the wheel at a creep speed in response to an indication of a vehicle not being stuck in a medium. In a sixth example that may include one or more of the first through fifth examples, the vehicle system includes where the medium is sand and where the creep speed is a predetermined speed to rotate the wheel at when the brake pedal is not applied and driver demand torque is zero.

Referring now to FIG. 4, a prophetic operating sequence according to the method of FIG. 5 is shown. The vehicle operating sequence shown in FIG. 4 may be provided via the method of FIG. 5 in cooperation with the system shown in FIGS. 1-3. The plots shown in FIG. 5 occur at the same time and are aligned in time. This prophetic operating sequence shows the method of FIG. 5 being applied to one wheel of a vehicle. The vertical lines at times t0-t6 represent times of interest during the sequence.

The first plot from the top of FIG. 4 is a plot of vehicle steering angle versus time. The vertical axis represents vehicle steering angle and the steering angle is positive above the horizontal axis (e.g. right turn) and negative below the horizontal axis (e.g., left turn). The steering angle magnitude increases in the direction of the vertical axis arrows. The horizontal axis represents time and time increases from the left side of the figure to the right side of the figure. Traces 402 and 404 represent example vehicle steering angles.

The second plot from the top of FIG. 4 is a plot of a speed of an electric machine that provides propulsive effort versus time. The vertical axis represents speed of the electric machine and the speed of the electric machine increases in the direction of the vertical axis arrow. The speed of the electric machine may be equal to or proportionate to a speed of a wheel that is coupled to the electric machine. The horizontal axis represents time and time increases from the left side of the figure to the right side of the figure. Trace 406 represents electric machine rotational speed.

The third plot from the top of FIG. 4 is a plot of a vehicle stuck state indicator versus time. The vertical axis represents the vehicle stuck or vehicle free state and the vehicle is free to move when trace 408 is at a lower level near the horizontal axis. The vehicle is determined to be stuck when trace 408 is at a higher level near the vertical axis arrow. The horizontal axis represents time and time increases from the left side of the figure to the right side of the figure. Trace 408 represents a vehicle stuck state.

The fourth plot from the top of FIG. 4 is a plot of a motor stalled state indicator versus time. The vertical axis represents the motor stalled state and the motor is stalled when trace 410 is at a higher level that is near the vertical axis arrow. The motor is determined to be stalled when trace 410 is at a higher level that is near the vertical axis arrow. The motor is determined to not be stalled when trace 410 is at a lower level that is near the horizontal axis. The horizontal axis represents time and time increases from the left side of the figure to the right side of the figure. Trace 410 represents the motor stall state.

The fifth plot from the top of FIG. 4 is a plot of a brake state indicator versus time. The vertical axis represents the brake state and the vehicle brake is applied when trace 412 is at a higher level near the vertical axis arrow. The vehicle brake is not applied when trace 412 is at a lower level near the horizontal axis. The horizontal axis represents time and time increases from the left side of the figure to the right side of the figure. Trace 412 represents a vehicle brake state.

The sixth plot from the top of FIG. 4 is a plot of a wheel not spinning state indicator versus time. The vertical axis represents the wheel not spinning state and the wheel not spinning state is asserted when trace 414 is at a higher level that is near the vertical axis arrow. The wheel not spinning state is not asserted when trace 414 is at a lower level that is near the horizontal axis. The horizontal axis represents time and time increases from the left side of the figure to the right side of the figure. Trace 412 represents the wheel not spinning state.

At time t0, the vehicle is stopped (not shown) and the vehicle steering angle is zero degrees. The vehicle's driver switches the vehicle operating mode to engage a vehicle operating mode to free the vehicle from a medium (e.g., a release from sand mode) (not shown). The vehicle is indicated as being stuck and the motor is not indicated as being stalled. The wheel brake is activated by the vehicle's operator (not shown) and the wheel not spinning state is not asserted. At time t1, the operator releases the wheel brake (not shown) to allow the method of FIG. 5 to activate and the steering angle begins to be automatically adjusted according to the method of FIG. 5. In one example, the steering angle may be adjusted according to a sine wave 404. In another example, the steering angle may be adjusted according to a triangle wave 402. The motor is in a stalled state and the vehicle remains stuck. The wheel not spinning state is not asserted.

At time t2, the steering angle continues to change and the motor speed begins to increase, which causes the motor stalled state to change to not asserted. By adjusting the steering angle, the stalled motor state has been cleared and the motor speed begins to move toward a commanded motor speed. The motor is operated in a speed control mode (not shown) where motor torque is adjusted to cause motor speed to follow a requested motor speed. The vehicle remains stuck and the brake state remains not asserted. The wheel not spinning state remains not asserted.

At time t3, the steering angle continues to be adjusted and the motor speed has increased to a lower level. The wheel not spinning state is asserted due to a wheel on an axle that is driven by an electric machine not rotating while a wheel coupled to the motor spins. The brake is applied automatically in response to the wheel not spinning state so that torque may be delivered to the wheel that is not spinning through an open differential. The brake is gradually applied. The motor is not stalled. Since the motor speed has reached a threshold level, the motor speed begins to be gradually reduced so that the controller may determine the motor speed where tire friction crosses back and forth between a static friction value and a dynamic friction value.

At time t4, the motor speed begins to begin to oscillate between a first lower speed and a second upper speed, which indicates the onset of jitter. This causes the controller to maintain the motor speed command at its present value (e.g., a constant value). The steering angle continues to be adjusted via the controller and the vehicle remains stuck. The motor is not stalled and the brake continues to be applied so that each wheel of an axle receives torque from the motor. The wheel not spinning state continues to be asserted, but the wheel not spinning state is not asserted shortly after time t4 where a second wheel of the axle begins to spin (not shown).

At time t5, the vehicle begins to move due to torque that is applied by the motor to the wheel. This causes the vehicle stuck state to clear (e.g., not be asserted). The steering angle is adjusted toward zero in response to the vehicle stuck state being cleared so that the vehicle may travel in a straight ahead direction. The motor is not stalled and the brake remains applied so that torque may be delivered to two wheels of an axle. The wheel not spinning state remains cleared.

At time t6, the vehicle steering angle is zero and the motor speed continues at a lower speed. The vehicle stuck state is not asserted and the motor is not stalled. The brake state is not asserted so that the vehicle brake is released and the wheel not spinning state is not asserted.

In this way, a vehicle's steering angle may be automatically adjusted in response to an operator engaging a mode to free a vehicle from a stuck state. In addition, a motor may be controlled in a speed control mode to determine a motor speed where tire friction changes or crosses between a static friction value between a tire and sand that is not moving and a dynamic friction value between the tire and the sand when the stand is moving from torque that is applied to the vehicle's wheel. Operating the motor at this speed may allow a wheels tire to achieve a desired level of traction that allows the vehicle to move in a forward or reverse direction.

Referring now to FIG. 5, an example method for operating a vehicle in sand or another deformable medium is shown. The method of FIG. 5 may be incorporated into and may cooperate with the systems of FIGS. 1-3. Further, at least portions of the method of FIG. 5 may be incorporated as executable instructions stored in non-transitory memory while other portions of the method may be performed via a controller transforming operating states of devices and actuators in the physical world.

Method 500 may be activated in response to a user requesting that the vehicle enter a vehicle in a mode to free the vehicle from a medium (e.g., sand). The user may request activation of the mode via a user interface. In addition, method 500 may execute only after a brake pedal is released in some examples.

At 502, method 500 adjusts a rotational speed command of an electric machine (e.g., a motor) to achieve a target rotational wheel speed, and the target rotational wheel speed is to be in a dynamic friction range. The rotational speed of the electric machine may be independent from a position of the driver demand pedal. After an initial target rotational wheel speed is reached, the rotational speed command is gradually reduced so that there is a new target rotational wheel speed, thereby reducing the motor speed. There may be a short duration where the rotational wheel speed command is not decreased between each time the rotational wheel speed command is decreased so that the controller may determine whether or not there is jitter at the present rotational wheel speed. The initial target rotational wheel speed is commanded when the vehicle is engaged in a mode to free the vehicle from a medium. The initial target rotational speed may be a speed that is greater than a target rotational wheel speed where friction between a tire of the wheel and sand crosses between or changes between a static friction value and a dynamic friction value. The static friction value is a friction force value that is between the tire and the sand when the tire is stationary with respect to the sand. The dynamic friction value is the friction force value between the tire and the sand when the tire is moving with respect to the sand.

Method 500 may also command the vehicle steering angle on the motor driven axle or wheel to an angle that varies from a positive angle to a negative angle as the vehicle steering angle follows a triangle, sine, or other function to shift sand under the motor driven wheel. Additionally, method 500 may engage an axle lock for an axle that is driven via a motor. Method 500 proceeds to 504.

At 504, method 500 judges whether or not the target rotational wheel speed has been achieved. Method 500 may compare an actual rotational wheel speed to the rotational speed command of the electric machine adjusted for any gear ratio between the wheel and the electric machine. If method 500 judges that the target rotational wheel speed has been achieved, the answer is yes and method 500 proceeds to 506. Otherwise, the answer is no and method 500 returns to 504.

At 506, method 500 judges whether or not jitter is detected. Jitter may be determined to be present based on a condition where motor speed begins to begin to oscillate between a first lower speed and a second upper speed as shown beginning at time t4 of FIG. 4. If method 500 judges that jitter is present, the answer is yes and method 500 proceeds to 508. Otherwise, method 500 proceeds to 515.

At 515, method 500 reduces the target rotational wheel speed and lowers the speed of the electric machine to reach the target rotational wheel speed. The target rotational wheel speed may be reduced by a predetermined amount (e.g., 0.25 revolutions/minute). Method 500 returns to 504.

At 508, method 500 determines that the optimal motor speed for freeing the vehicle is the present wheel speed where jitter was detected and method 500 maintains the electric machine speed at this speed. Method 500 proceeds to 520, 510, and 530.

At 520, method 500 judges whether or not the vehicle is unstuck or free from being stuck. In one example, method 500 may judge that the vehicle is unstuck if the vehicle has moved in a forward or reverse direction for a predetermined distance. The predetermined distance may be determined via a position or speed of a wheel that is not driven of via a global positioning system. If method 500 judges that the vehicle is free from being stuck, the answer is yes and method 500 proceeds to 522. Otherwise, the answer is no and method 500 returns to 508.

At 522, method 500 transitions back to a base wheel drive mode. In one example, the base mode is where the electric machine is operated in a torque control mode that is based on driver demand pedal position. While operating in the torque control mode, the electric machine may be commanded to provide a torque that propels the vehicle at a predetermined creep speed (e.g., 3 kilometers/hour). Method 500 proceeds to exit.

At 510, method 500 judges whether or not one wheel of an axle that is driven via an electric machine (if appropriate for the present vehicle configuration) is not spinning due to the motor attempting to achieve the target speed. If so, the answer is yes and method 500 proceeds to 512. If not, the answer is no and method 500 returns to 508.

At 512, method 500 engages a friction wheel brake so that torque may be directed to the wheel that is not spinning on the axle. Method 500 returns to 508.

At 530, method judges whether or not the motor is stalled. Method 500 may judge that the motor is stalled if motor rotational speed is less than a threshold speed (e.g., 0.5 revolutions/minute). If method 500 judges that the motor is stalled, the answer is yes and method 500 proceeds to 532. Otherwise, the answer is no and method 500 returns to 508.

At 532, method 500 judges whether or not the motor that is stalled is on a wheel or axle that may be adjusted via a steering system. If so, the answer is yes and method 500 proceeds to 534. Otherwise, the answer is no and method 500 proceeds to 536.

At 534, method 500 commands the vehicle steering angle on the motor driven axle or wheel to an angle that varies from a positive angle to a negative angle as the vehicle steering angle follows a triangle, sine, or other function to shift sand under the motor driven wheel. Method 500 returns to 508.

At 536, method 500 reverses the speed target on the wheel that is stalled until the wheel is no longer stalled, then the speed target of the formerly stalled wheel is returned to its prior target speed (e.g., the commanded motor speed that is expected to deliver the target rotational wheel speed when the wheel was stalled). For example, if the wheel was stalled with a commanded motor speed of 2 revolutions/minute in a forward direction, then the wheel is commanded in a reverse direction until the wheel is no longer stalled. The wheel is commanded back to 2 revolutions/minute in the forward direction when the wheel is no longer stalled. Method 500 returns to 508.

In this way, a vehicle that is stuck in sand may be freed. The vehicle may be freed by a combination of adjusting a steering angle and via controlling wheel speed. The wheel speed may be controlled so that a target rotational wheel speed where friction between a tire of the wheel and sand crosses between or changes between a static friction value and a dynamic friction value is achieved.

Thus, the method of FIG. 5 provides for a vehicle operating method, comprising: in response to operating a vehicle in a mode to free the vehicle from a medium, commanding a motor via a controller to rotate a wheel at a constant speed at which an actual speed of the wheel increases and decreases. In a first example, the vehicle operating method includes where the constant speed is a speed that is within a range where a friction between the wheel's tire and the medium changes from a static friction to a dynamic friction. In a second example that may include the first example, the vehicle operating method includes where the speed of the wheel increases and decreases due to the vehicle operating in the medium, and where the medium is sand. In a third example that may include one or both of the first and second examples, the vehicle operating method includes where the motor is commanded in further response to a brake pedal being released. In a fourth example that may include one or more of the first through third examples, the vehicle operating method of claim 4, where the constant speed is not based on a position of a driver demand pedal. In a fifth example that may include one or more of the first through fourth examples, the method further comprises applying a vehicle brake in response to the wheel not rotating. In a sixth example that may include one or more of the first through fifth examples, the method further comprises varying a steering angle in response to operating a vehicle in a mode to free the vehicle from a medium. In a seventh example that may include one or more of the first through sixth examples, the method includes where varying the steering angle includes adjusting the steering angle to follow a triangle wave.

The method of FIG. 5 also provides for a vehicle operating method, comprising: in response to operating a vehicle in a mode to free the vehicle from a medium, commanding a vehicle steering system via a controller to vary a steering angle of a wheel. In a first example, the vehicle operating method includes where the steering angle is varied to follow a triangle wave. In a second example that may include the first example, the vehicle operating method includes where the steering angle is varied to follow a sine wave. In a third example that may include one or both of the first and second examples, the vehicle operating method further comprises commanding an electric machine to rotate a wheel at a constant speed. In a fourth example that may include one or more of the first through third examples, the vehicle operating method further comprises applying a vehicle brake without applying a brake pedal while operating the vehicle in the mode to free the vehicle from the medium.

Referring now to FIG. 6A, a schematic showing vehicle 121 operating with a steering angle of zero degrees is shown. Longitudinal axis 600 of vehicle 121 is shown bisecting vehicle 121 for the length of vehicle 121. Each of wheels 130a and 130b include longitudinal axis that are parallel with vehicle longitudinal axis 600. The longitudinal axis 602 of wheels 130a and 130b turn as wheels 130a and 130b turn. The angle between the wheel longitudinal axis 602 and the vehicle longitudinal axis 600 is the steering angle. In this example, the steering angle is zero since wheel longitudinal axis 602 is parallel with vehicle longitudinal axis 600. Vehicle 121 travels in a straight path when the wheel longitudinal axis 602 is in parallel with the vehicle longitudinal axis 600.

Referring now to FIG. 6B, a schematic showing vehicle 121 operating with a steering angle of e degrees is shown. As shown in FIG. 6A, longitudinal axis 600 of vehicle 121 is shown bisecting vehicle 121 for the length of vehicle 121. Wheel longitudinal axis 602 for each of wheels 130a and 130b are not parallel with vehicle longitudinal axis 600. Rather, wheel longitudinal axes 602 are oriented at an angle θ from vehicle longitudinal axis 600. The angle θ is shown at 605 for each of wheel 130a and wheel 130b. The angle θ between the wheel longitudinal axis 602 and the vehicle longitudinal axis 600 is the steering angle. The angle between where wheel axis 602 is parallel with vehicle longitudinal axis 600 and the wheel axis 602 when wheels 130a and 130b are turned may also be referred to as the steering angle.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
   in response to operating a vehicle in a mode to free the vehicle from a medium, commanding a motor via a controller to rotate a wheel at a constant commanded speed at which an actual speed of the wheel increases and decreases even though the commanded speed is constant.

2. The vehicle operating method of claim 1, where the constant commanded speed is a speed that is within a range where a friction between a tire of the wheel and the medium changes from a static friction where the medium is not moving to a dynamic friction where the medium is moving.

3. The vehicle operating method of claim 1, where the actual speed of the wheel increases and decreases even though the commanded speed is constant due to the vehicle operating in the medium, and where the medium is sand.

4. The vehicle operating method of claim 1, where the motor is commanded in further response to a brake pedal being released.

5. The vehicle operating method of claim 4, where the constant commanded speed is not based on a position of a driver demand pedal.

6. The vehicle operating method of claim 5, further comprising applying a vehicle brake in response to the wheel not rotating.

7. The vehicle operating method of claim 6, further comprising varying a steering angle in response to operating the vehicle in the mode to free the vehicle from the medium.

8. The vehicle operating method of claim 7, where varying the steering angle includes adjusting the steering angle to follow a triangle wave.

9. A vehicle system, comprising:
   an electric machine;
   a wheel;
   one or more controllers including executable instructions stored in non-transitory memory that cause the one or more controllers to generate a command to rotate the wheel at a speed, generate commands to decrease a rotational speed of the wheel from the speed, and generate a command to continue to maintain the rotational speed in response to an actual speed of the wheel increasing and decreasing while maintaining the rotational speed command.

10. The vehicle system of claim 9, where the command to rotate the wheel at the speed is generated in a vehicle operating mode for freeing a vehicle from a medium.

11. The vehicle system of claim 10, where the electric machine rotates the wheel in response to the command to rotate the wheel.

12. The vehicle system of claim 9, further comprising a steering system, and additional instructions to vary a steering angle via the steering system in response to an indication of a vehicle being stuck.

13. The vehicle system of claim 9, further comprising a brake pedal, and where the command to rotate the wheel is generated while the brake pedal is released.

14. The vehicle system of claim 13, further comprising additional instructions to generate a command to rotate the wheel at a creep speed in response to an indication of a vehicle not being stuck in a medium.

15. The vehicle system of claim 14, where the medium is sand and where the creep speed is a predetermined speed to rotate the wheel at when the brake pedal is not applied and driver demand torque is zero.

16. A vehicle operating method, comprising:
   in response to operating a vehicle in a mode to free the vehicle from a medium, commanding a vehicle steering system via a controller to vary a steering angle of a wheel; and
   applying a vehicle brake without applying a brake pedal while operating the vehicle in the mode to free the vehicle from the medium.

17. The vehicle operating method of claim 16, where the steering angle is varied to follow a triangle wave.

18. The vehicle operating method of claim 16, where the steering angle is varied to follow a sine wave.

19. The vehicle operating method of claim 16, further comprising commanding an electric machine to rotate the wheel at a constant speed.

20. The vehicle operating method of claim 16, further comprising commanding a motor via the controller to rotate the wheel at a constant commanded speed within a range where a friction between a tire of the wheel and the medium changes from a static friction where the medium is not moving to a dynamic friction where the medium is moving.

* * * * *